United States Patent [19]

Dvorak et al.

[11] Patent Number: 5,072,328
[45] Date of Patent: Dec. 10, 1991

[54] POWER CONTROL RELAY FOR ELECTRICAL OUTLETS WHICH MAINTAINS POSITION IN ABSENCE OF SOLENOID ENERGIZATION

[75] Inventors: Robert F. Dvorak, Mount Vernon, Iowa; Dennis W. Fleege, Lexington, Ky.

[73] Assignee: Square D Company, Palatine, Ill.

[21] Appl. No.: 588,910

[22] Filed: Sep. 27, 1990

[51] Int. Cl.⁵ .................. H01H 47/00; H01H 9/00
[52] U.S. Cl. .............................. 361/210; 335/177
[58] Field of Search .......... 361/160, 166, 167, 168.1, 361/169.1, 170, 173, 175, 176, 183, 186, 191, 206, 210; 307/150–155, 140; 335/177, 185, 181, 190

[56] References Cited

U.S. PATENT DOCUMENTS

| | | | |
|---|---|---|---|
| 3,418,488 | 12/1968 | Platzer | 361/160 |
| 3,600,637 | 8/1971 | Bergkvist | 361/172 |
| 4,341,556 | 7/1982 | Bohm et al. | 148/430 |
| 4,630,166 | 12/1986 | D'Onofrio | 361/205 |

FOREIGN PATENT DOCUMENTS

| | | | |
|---|---|---|---|
| 0499529 | 6/1930 | Fed. Rep. of Germany | 361/160 |
| 0453485 | 4/1945 | Italy | 361/160 |

*Primary Examiner*—J. R. Scott
*Assistant Examiner*—Richard Elms
*Attorney, Agent, or Firm*—Larry I. Golden; Jose W. Jimenez

[57] ABSTRACT

A power control relay has a pair of solenoids one of which is briefly energized to open a pair of contacts and the other is opened briefly to close the contacts. A mechanical linkage maintains the contacts in their closed and open positions in the absence of solenoid energization. In a preferred embodiment of the invention, the solenoids drive a cam back and forth between two stable positions. The cam toggles an arm which opens and closes the power switch contacts.

10 Claims, 6 Drawing Sheets

POWER CONTROL RELAY FOR ELECTRICAL OUTLETS WHICH MAINTAINS POSITION IN ABSENCE OF SOLENOID ENERGIZATION

BACKGROUND OF THE INVENTION

1. Field of the Invention

The present invention generally relates to electromechanical power-switching relays, and more particularly to a compact relay suitable for mounting in a outlet, particularly an outlet in a residential dwelling.

2. Description of the Prior Art

There have been proposals in the prior art for controlling various electrical products used in a home. These proposals involve switching power to the product at an outlet to which the product is connected in response to a remotely generated control signal. The control signal may be generated by a programmed processor for automatically turning on a coffee pot and lights in the morning, for example, or it may be generated by a local manual control. Due to the limited space available at a residential outlet, prior art electromechanical relays of sufficient capacity to perform the required switching function, are too large for satisfactory installation, dissipate excessive heat, and may be destroyed by short-circuit currents to which they may be subjected.

SUMMARY OF THE INVENTION

It is therefore an object of the present invention to provide a compact electromechanical relay assembly; one that does not draw current to maintain it in either its on or off state. A further object of the invention is the provision of such a relay which is economical to manufacture.

Briefly, this invention contemplates the provision of power control relay in which one of a pair of solenoids is briefly energized to open a pair of contacts and the other is energized briefly to close the contacts. A mechanical linkage maintains the contacts in their closed and open positions in the absence of solenoid energization. In preferred embodiment of the invention, the solenoids drive a cam back and forth between two stable positions. The cam toggles a blade which opens and closes the power switch contacts.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
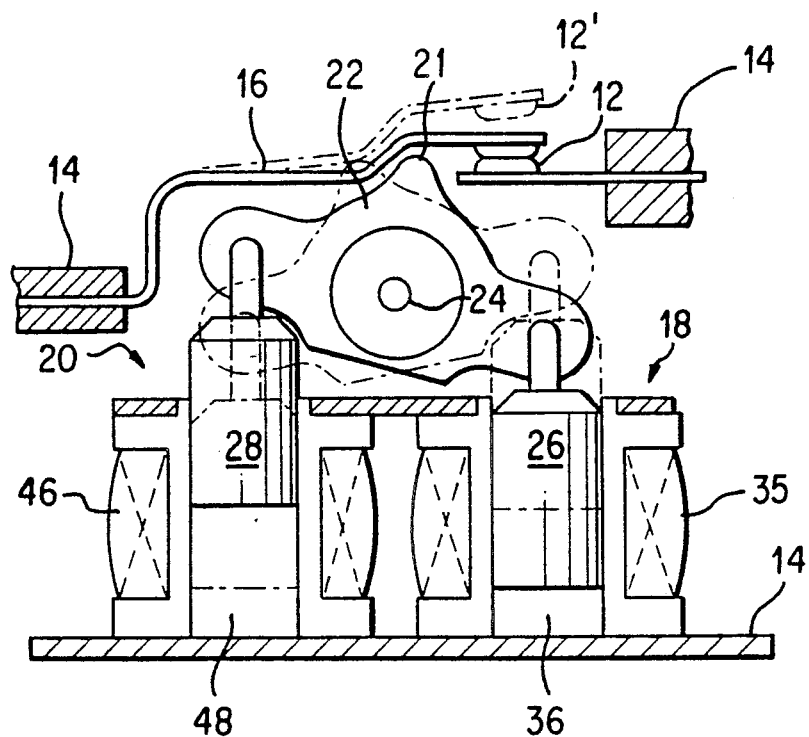
FIG. 1 is a schematic side elevation view of a power-switching relay in accordance with the of this invention.

Referring now to FIG. 1, a power controller in accordance with the teachings of this invention has a pair of separable electrical contacts 12 and 12' which preferably are made of a weld resistant contact material such as silver-tin oxide or silver graphite. A mounting base 14 (indicated schematically) supports the contacts and the other components of the assembly. One of the contacts 12 is rigidly mounted to the base and a flexible blade 16 carries the other contact 12'. The blade 16 exerts a spring force urging the contacts to the closed position, and exerts the correct contact force for low resistance.

Two solenoids; an "ON" solenoid 18 and an "OFF" solenoid 20 are also mounted on the base 14. A pin 24 rotably mounts a cam 22 to the base so that a lobe 21 on the surface of the cam engages the blade 16. A plunger 26 of solenoid 18 is pivotably coupled to one side of the cam 22 so that when the solenoid 18 is energized, the cam rotates in a clockwise direction. The spring force of the blade 16 causes the contacts to close with the cam in this position. A plunger 28 of solenoid 20 is coupled to the other side of cam 22, and when this solenoid is energized, the cam rotates in a counterclockwise direction and the lobe 21 forces the contacts apart against the force exerted by the spring blade 16.

Figure 2:
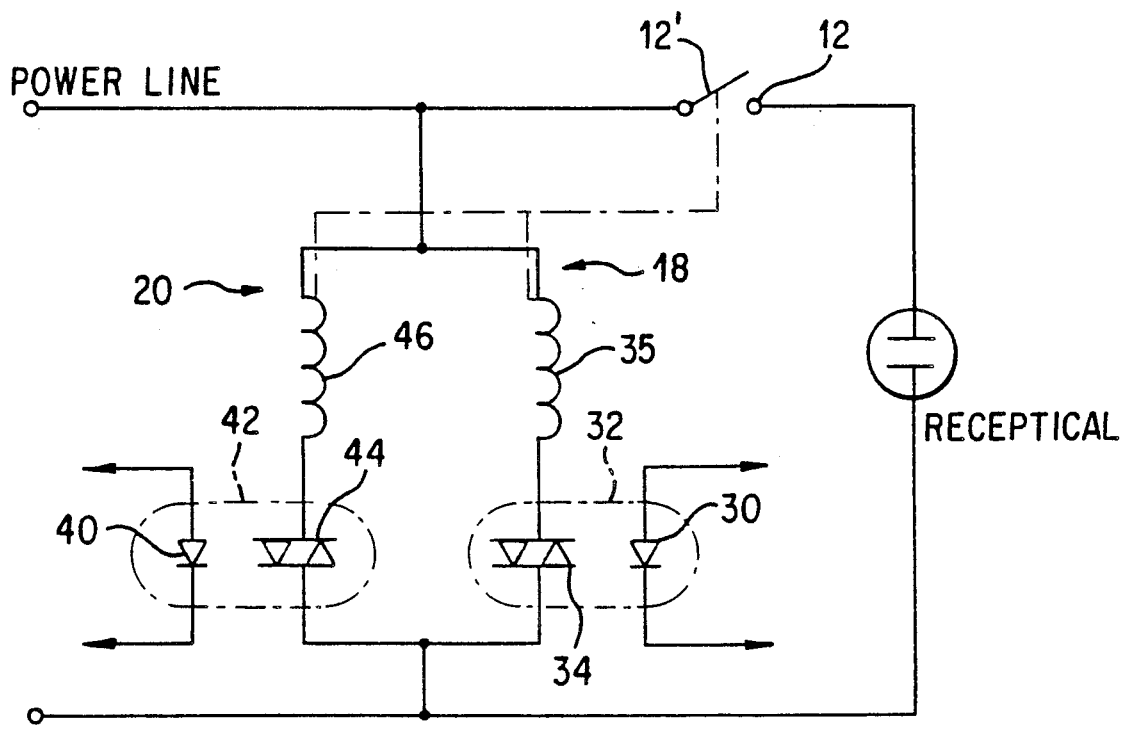
FIG. 2 is an electrical schematic drawing of a circuit for operating a relay in accordance with the teaching of this invention, such as for example the relay shown in FIG. 1.

Referring now to FIG. 2 in addition to FIG. 1, to close the contacts, a controller (not shown) applies a short current pulse to Light Emitting Diode (LED) 30 of a suitable, commercially available opto-coupler 32. The LED 30 turns on a triac 34, momentarily applying line voltage to a coil 35 of the "ON" solenoid 18, driving arm 26 toward an anvil 36 and rotating cam 22 in a clockwise direction causing the cam lobe 21 to slip off the blade offset and allow the contacts 12 and 12' to close. The controller current pulse to LED 30 is only long enough to insure that the solenoid has pulled the cam to its full clockwise stable position with the plunger 26 engaging anvil 36. After the control pulse terminates, triac 34 continues to conduct until the next zero crossing of the line current, and then turns off. The spring force of the blade keeps the contacts closed until solenoid 20 is energized.

To open the contacts the operation is similar to that just described. The controller applies a current pulse to LED 40 of an opto-coupler 42 which turns on a triac 44. With the triac on, line voltage is momentarily applied to an operating coil 46 of "OFF" solenoid 20 driving its plunger 28 towards an anvil 48. The cam 22 rotates in a counterclockwise direction causing the cam lobe 21 to slide under the offset in the blade forcing the contacts apart. The plunger 26 is pulled out of the de-energized solenoid 18 and the cam continues to rotate until the arm 28 contacts anvil 48, a stable position with the spring force of the blade acting on the cam lobe. As explained above, the controller pulse is only long enough to insure that the solenoid has pulled the cam to its full counterclockwise position. After the control pulse terminates, triac 44 continues to conduct until the next aero crossing of the line current, and then turns off.

It will be appreciated that the relay thus far described may be used to interrupt ground faults at the electrical outlet in addition to normal on-off power functions. In this case, a ground fault detector may be used to generate a pulse to LED 40 in the same fashion as a normal OFF command. Here it is important to minimize the pulse width of the "ON" command to LED 30 to insure a fault generated OFF command can open the contacts to clear a fault within specified limits (e.g. UL limits).

Figure 3:
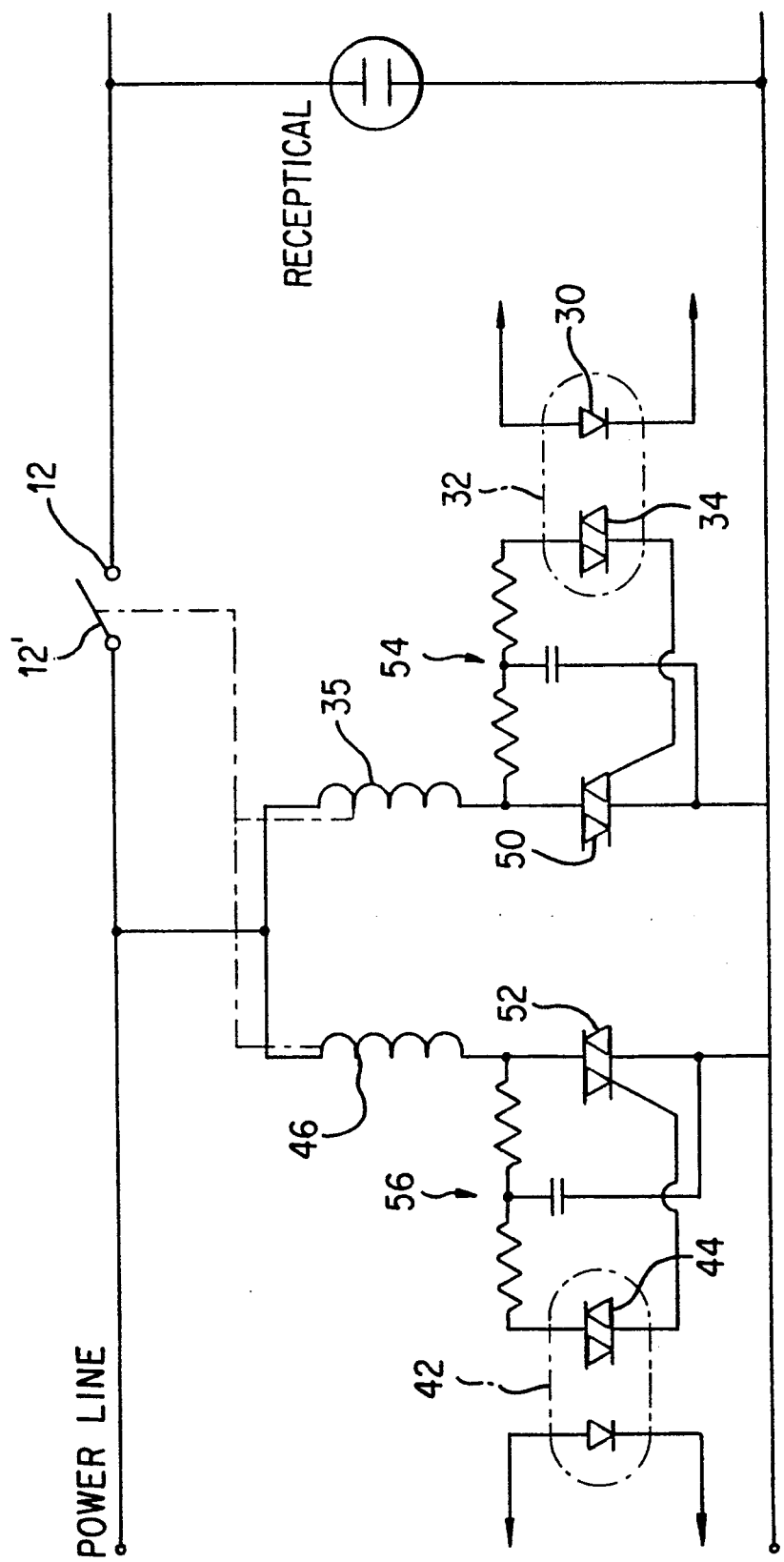
FIG. 3 is a schematic drawing similar to FIG. 2 of an alternate embodiment of the circuit shown in FIG. 2.

Referring now to FIG. 3, the inductance of the coils 34 and 46 may be in some designs so large that the current generated by the collapsing field at turn-off should be dissipated. In this case, external triacs 50 and 52 in combination respectively with snubbing circuits 54 and 56, may be added to the circuit of FIG. 2 to dissipate the energy in the coils at turn-off.

Figure 4:
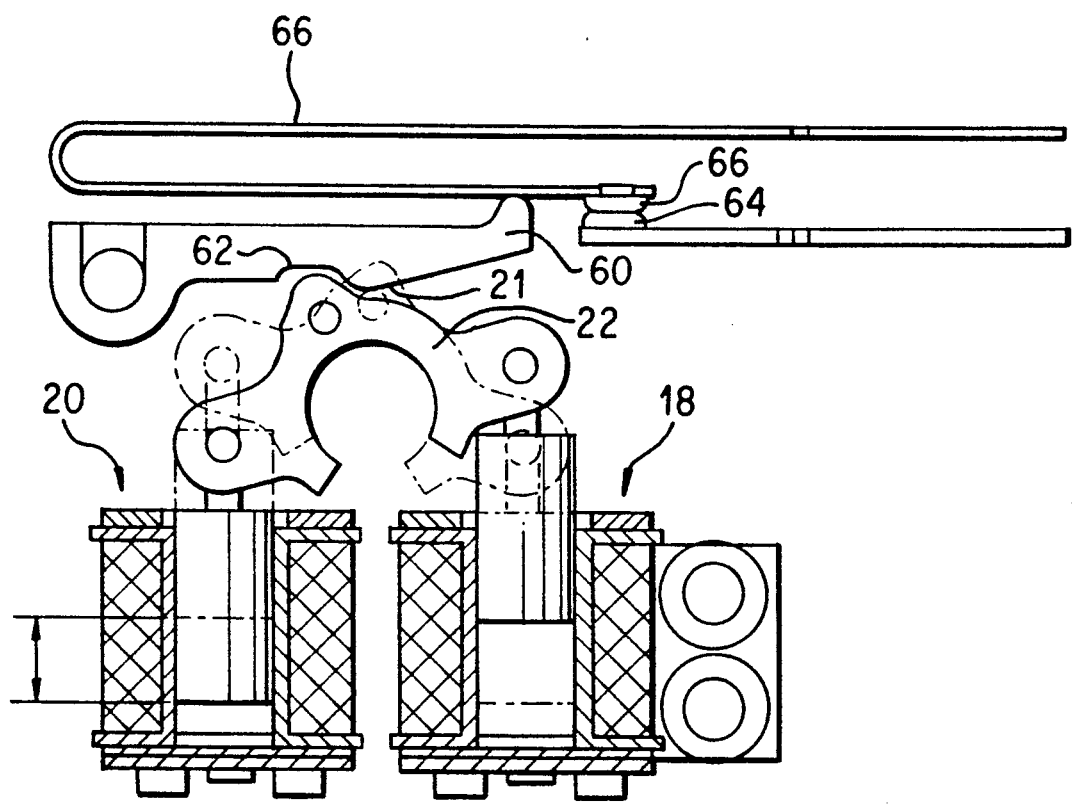
FIG. 4 is a view similar to FIG. 1 showing an alternate blade and cam surface design which may be used in the practice of the invention.

Referring now to FIG. 4, in this embodiment a pivoted lever 60 has a cam surface 62 which cooperates with the lobe 21 to open and close a fixed contact 64 and a movable contact 66. Movable contact 66 is formed at one end of a "U"-shaped conductive spring arm 66, which exerts a spring force urging the contacts to their closed position.

This structure may be employed in lieu of that shown in FIG. 1 to enhance the relay's survival under high fault conditions. When a fault occurs, the opposite legs of "U" shaped contact arm are repelled by the magnetic forces of the fault current, thus pushing the contacts 64 and 66 against one another with sufficient force to overcome the blow-off force generated by the constriction resistance of the contact and holding the contact closed until a series overcurrent protective device clears the fault. By judiciously choosing a contact material with strong weld resistance such as silver tin oxide or silver graphite, the relay contacts can be prevented from welding during the flow of fault current.

Figure 5:
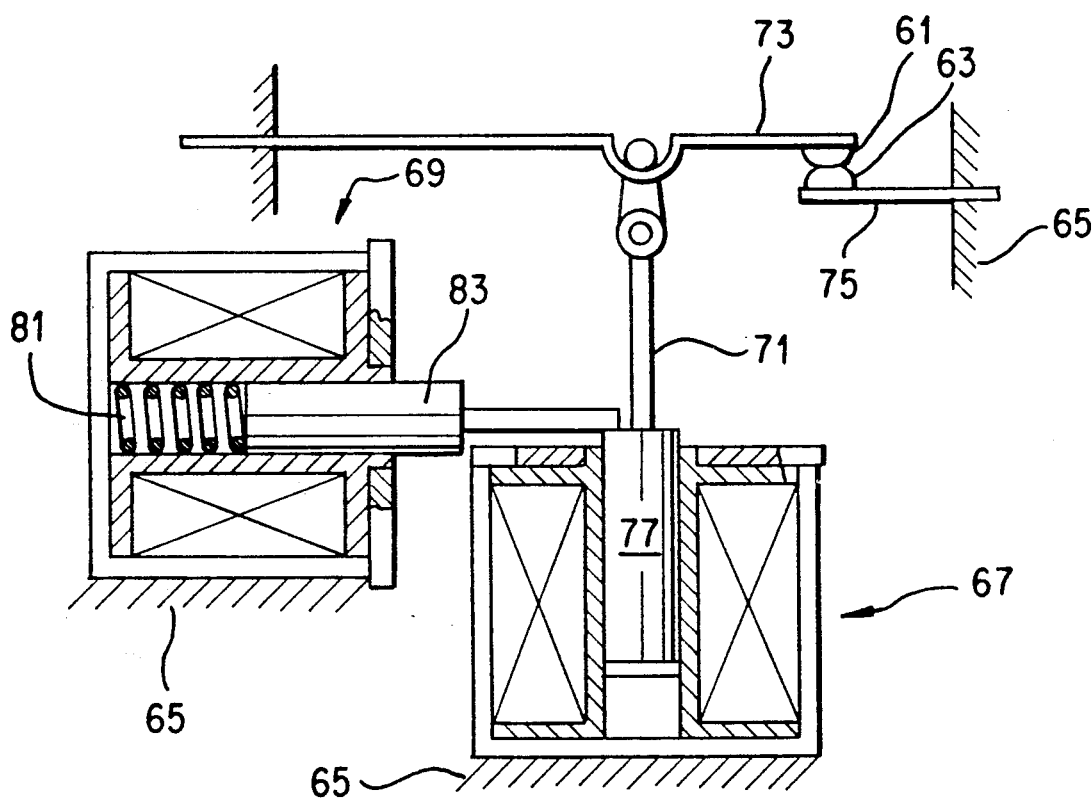
FIG. 5 is a schematic view of an alternate embodiment of the invention.

FIG. 5 shows an alternate embodiment of the invention. As shown in FIG. 5, the power control relay basically consists of a separable pair of electrical contacts 61 and 63, a mounting base 65, an "ON" solenoid 67, an "OFF" solenoid 69, and an insulating link 71. A movable contact arm 73 and stationary contact arm 75 are molded in the insulating base. A movable contact blade 73 is of a conductive spring metal which is formed such that it normally is biased away from the stationary contact arm.

The circuit shown in FIG. 2 or 3 may be used to operate this embodiment of the invention. In operation, energization of "ON" solenoid 67 causes its plunger 77 to move downward pulling the contacts closed. A spring 81 urges the plunger 83 of the "OFF" solenoid 69 out of the coil and locks the "ON" solenoid in position after the "ON" current pulse terminates. Energizing the "OFF" solenoid with a short current pulse, withdraws the solenoid plunger, and the spring force of the contact blade causes the contacts to open.

Figure 6:
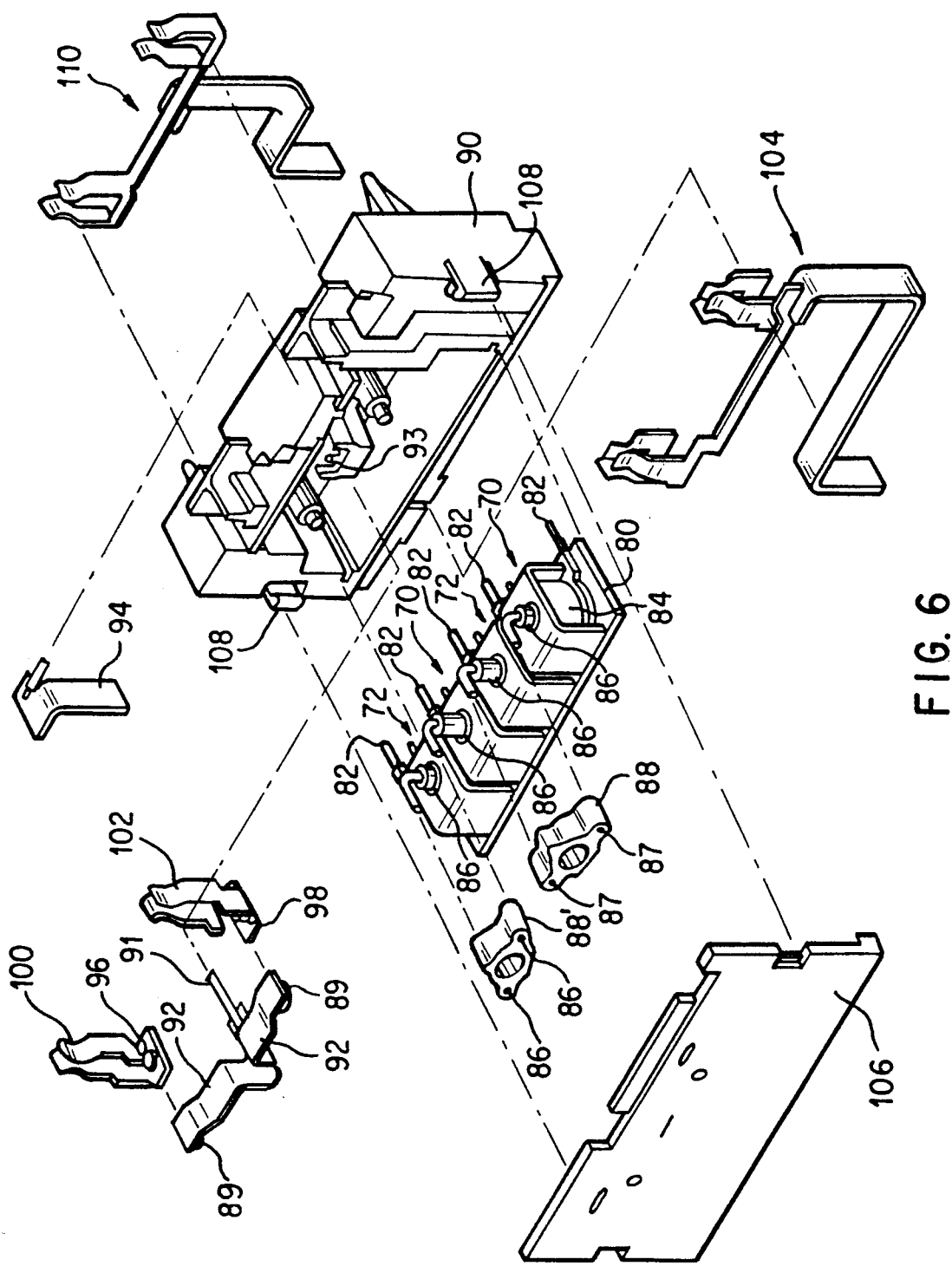
FIG. 6 is a perspective, exploded view of the coil subassembly, for a duplex switch, in accordance with the embodiment of the invention disclosed in FIG. 1.
Figure 7:
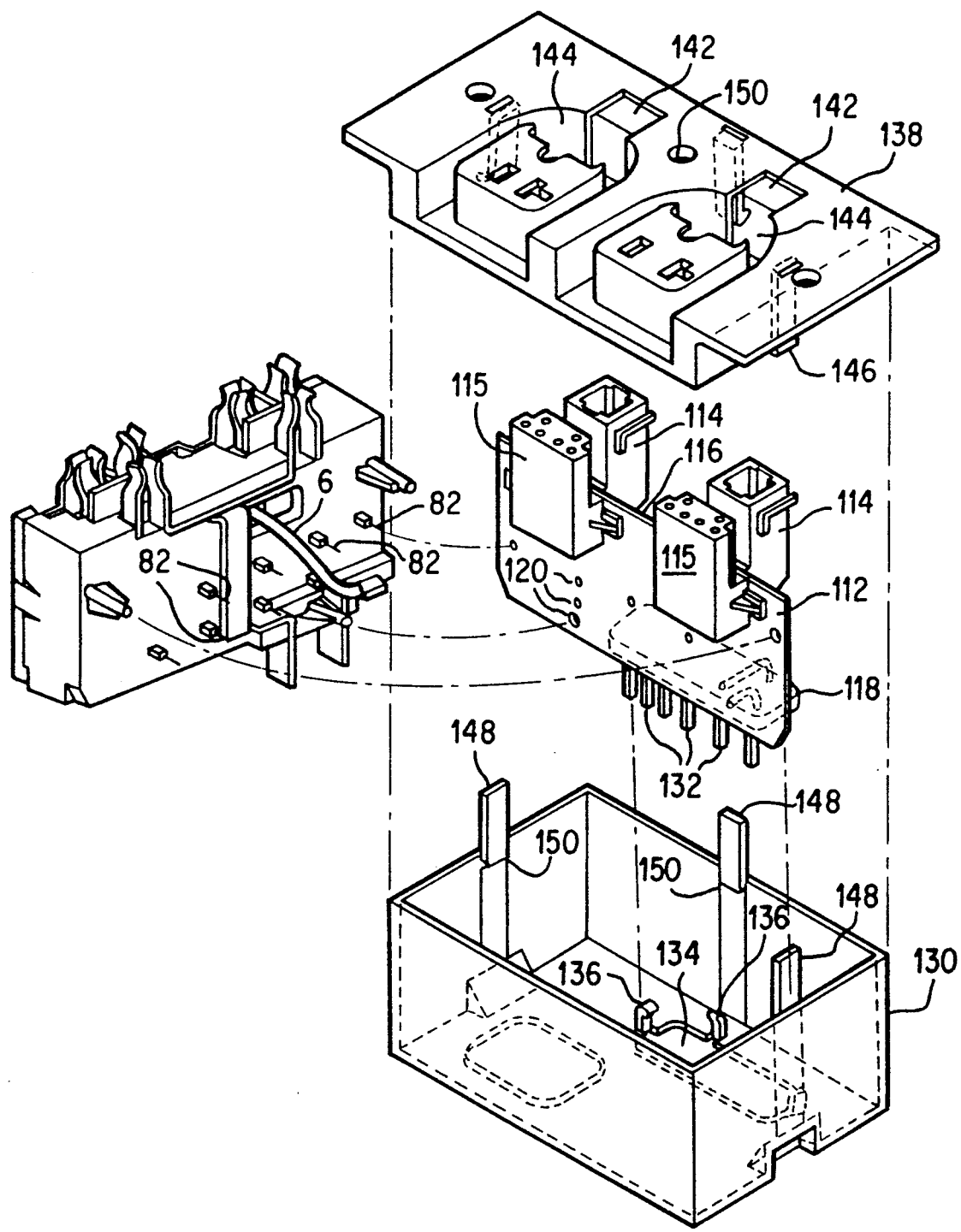
FIG. 7 is a perspective, partially exploded view of a duplex receptacle switch using the subassembly of FIG. 6.

Referring now to FIGS. 6 and 7, they show a specific embodiment similar to that shown in FIG. 1 of the invention for a duplex receptacle assembly which is advantageous from a manufacturing standpoint. Four solenoids, two "ON" solenoids 70 and two "OFF" solenoids 72 are mounted on a frame 80. Pins 82 provide an electrical connection to the solenoid coils 84. Plungers 86 are inserted into the coils and the bent over ends the arms are adapted to be inserted in holes 87 in cams 88.

The coil, plunger and cam subassembly is inserted into a base 90 as illustrated in FIG. 6. Contacts 89 are welded to unitary movable blade assembly 92 and a wire 91 for connecting the blade to an external power source is welded, brazed or soldered to the blade assembly 92. The wire 91 feeds through a slot 93 in the base 90 and the blade is positioned as best shown in the FIG. 6. The wire 91 is welded, brazed or soldered to a power bus 94 which is then inserted into the base. Fixed contacts 96 and 98 are welded to power connectors 100 and 102 respectively, which are then both inserted into the base 90.

A neutral connector assembly 104 is next inserted into base 90 as shown in FIG. 6. A cover 106 is then placed on the base 90 holding all the previously inserted parts in place. Snaps 108 secure the cover 106 to base 90. A ground connector assembly 110 is then inserted into the internal base 90. This subassembly will be called the internal base assembly in the following description.

Referring now to FIG. 7, a circuit board 112 has two telephone headers 114, two data point headers 115, a LED indicator 116 and a tap header 118 attached to it. Circuit board 112 has mounting holes 120 to allow attachment to it of the internal base assembly by means of the three bosses which protrude through the circuit board mounting holes. Circuit board 112 also has quick connect terminals which accept coil pins 82 that electrically connect the coils to the drive circuit on the circuit board 112. After the assembly of the internal base and circuit board is complete, this new subassembly is then inserted into a base 130. Data pins 132 are placed into and through opening 134 in the base. At the same time power buses are placed into and through opening 135. Just before final insertion, snaps 136 on the base are deflected by the tap header 118. At full insertion snaps 136 spring back to retain header 118. The snaps provide strain relief to the header so plug-in forces during use of this module are not exerted on the circuit board connections. A cover 138 is now assembled onto the base 130. The connectors fit into pockets inside of the cover 138 and the telephone connectors 114 and data pin headers 115 fit into open areas 142 and 144 respectively, on the cover. Cover snaps 146 are deflected as they slide over tabs 148 in the base 130. As the cover is fully inserted onto the base the snaps 148 return to a latched position under the lips 150 of tabs 148. The tabs 148 block the snap undercut openings 146, eliminating the possibility of tampering with the module by others than the manufacturer. The LED mounted on the circuit board, when lit, can be seen through the cover at the opening 150.

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. A power control relay for electrical outlets comprising in combination:
    a pair of contacts, one of said contacts of said pair movable relative to the other of said contacts;
    a first solenoid with a plunger movable between a first position and a second position;
    a second solenoid with a plunger movable between a first position and a second position;
    a circuit coupled to said first solenoid and said second solenoid;

said circuit briefly energizing said first solenoid to drive its plunger to its first position in response to a close contact signal;

said circuit briefly energizing said second solenoid to drive its plunger to its first position in response to an open contact signal;

means to mechanically link said first and second solenoid plungers to said one relatively movable contact;

said first solenoid plunger closing said contacts by means of said means to mechanically link as it moves to its first position with said means to mechanically link exerting a force sufficient to maintain said first plunger in its first position in the absence of an energizing current in said first solenoid and said second solenoid; and said second solenoid plunger opening said contacts by means of said means to mechanically link as said second solenoid plunger moves to its first position with said means to mechanically link exerting a force to maintain said second plunger in its first position in the absence of an energizing current in said first solenoid and said second solenoid.

2. A power control relay for electrical outlets as in claim 1, wherein said means to mechanically link includes a cam and a resilient cam follower with said movable contact coupled to said cam follower, said cam being coupled to said first and second solenoid plunger and rotatable between a first and second position in response to a force exerted by said first and second solenoid plungers, said cam follower exerting a force on said cam to maintain said first solenoid plunger in its first position when said cam is in its first position, and maintain said second solenoid plunger in its first position when said cam is in its second position.

3. A power control relay for electrical outlets as in claim 1, wherein said circuit includes an optocoupler for energizing said solenoids.

4. A power control relay for electrical outlets as in claim 2, wherein said circuit includes an optocoupler for energizing said solenoids.

5. A power control relay for electrical outlets as in claim 1, wherein said contacts are made of a weld resistant material.

6. A power control relay for electrical outlets as in claim 2, wherein said contacts are made of a weld resistant material.

7. A power control relay for electrical outlets as in claim 1, wherein said relatively movable contact is affixed to resilient "U"-shaped conductor.

8. A power control relay for electrical outlets as in claim 7, wherein said contacts are made of a weld resistant material.

9. A power control relay for electrical outlets as in claim 2, wherein said solenoids, said contacts, said cam, and cam follower are mounted on a subassembly which is snap mounted to a printed circuit board assembly.

10. A power control relay for electrical outlets as in claim 2, wherein said relatively movable contact made of a weld resistant material and is affixed to a resilient "U"-shaped conductor.

* * * * *